United States Patent
Kinoshita et al.

(10) Patent No.: US 11,498,035 B2
(45) Date of Patent: Nov. 15, 2022

(54) ZEOLITE MEMBRANE COMPLEX, METHOD FOR PRODUCING ZEOLITE MEMBRANE COMPLEX, AND SEPARATION METHOD

(71) Applicant: NGK INSULATORS, LTD., Nagoya (JP)

(72) Inventors: Naoto Kinoshita, Nagoya (JP); Makiko Ichikawa, Nagoya (JP); Kenji Yajima, Nagoya (JP); Makoto Miyahara, Nagoya (JP); Katsuya Shimizu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 253 days.

(21) Appl. No.: 17/015,469

(22) Filed: Sep. 9, 2020

(65) Prior Publication Data
US 2020/0398228 A1 Dec. 24, 2020

Related U.S. Application Data

(63) Continuation of application No. PCT/JP2019/003911, filed on Feb. 4, 2019.

(30) Foreign Application Priority Data

Mar. 30, 2018 (JP) .............................. JP2018-067396

(51) Int. Cl.
*B01D 53/22* (2006.01)
*B01D 71/02* (2006.01)
(Continued)

(52) U.S. Cl.
CPC ......... *B01D 71/028* (2013.01); *B01D 53/228* (2013.01); *B01D 67/0051* (2013.01);
(Continued)

(58) Field of Classification Search
CPC .. B01D 69/10; B01D 67/0051; B01D 71/028; B01D 53/228; B01D 2323/24; B82Y 30/00
See application file for complete search history.

(56) References Cited

U.S. PATENT DOCUMENTS

| 6,193,784 | B1 | 2/2001 | Yazawa et al. |
| 2003/0028064 | A1* | 2/2003 | Nakao ................... C07C 7/13 585/820 |

(Continued)

FOREIGN PATENT DOCUMENTS

| CN | 102333584 A | 1/2012 |
| JP | H09-157062 A1 | 6/1997 |

(Continued)

OTHER PUBLICATIONS

Machine translation of JP 2002201020 A, Ando (Year: 2002).*

(Continued)

*Primary Examiner* — Anthony R Shumate
(74) *Attorney, Agent, or Firm* — Burr & Brown, PLLC

(57) ABSTRACT

A zeolite membrane complex includes a porous support, and a zeolite membrane formed on the support. The zeolite membrane includes a zeolite crystal phase constituted by a plurality of zeolite crystals, and a dense grain boundary phase, which is a region between the plurality of zeolite crystals. A density of at least part of the grain boundary phase is smaller than a density of the zeolite crystal phase. A width of the grain boundary phase is 2 nm or more and 10 nm or less. Accordingly, it is possible to realize high permeability and high separating performance, and high durability of the zeolite membrane.

11 Claims, 3 Drawing Sheets

(51) Int. Cl.
*B01D 67/00* (2006.01)
*B01D 69/10* (2006.01)
*B82Y 30/00* (2011.01)

(52) U.S. Cl.
CPC .......... *B01D 69/10* (2013.01); *B01D 2323/24* (2013.01); *B82Y 30/00* (2013.01)

(56) References Cited

U.S. PATENT DOCUMENTS

| | | | |
|---|---|---|---|
| 2004/0191522 A1* | 9/2004 | Haring | H01M 8/1079 428/411.1 |
| 2006/0237360 A1 | 10/2006 | Mizuno et al. | |
| 2012/0024777 A1 | 2/2012 | Sugita et al. | |
| 2012/0148828 A1* | 6/2012 | Tsapatsis | B01D 67/0083 423/709 |
| 2013/0064724 A1* | 3/2013 | Huang | B01D 69/10 422/168 |
| 2015/0108066 A1* | 4/2015 | Ren | C02F 3/2813 210/151 |
| 2015/0283515 A1* | 10/2015 | Koiwa | B01D 65/08 210/488 |
| 2016/0359139 A1* | 12/2016 | Shintani | H01L 51/5253 |
| 2017/0189862 A1* | 7/2017 | Imasaka | B01J 20/3238 |
| 2017/0217858 A1* | 8/2017 | Laroche | B01J 20/28004 |
| 2017/0361282 A1* | 12/2017 | Kinoshita | B01D 69/12 |
| 2018/0237304 A1* | 8/2018 | Khe | C01B 32/194 |
| 2018/0298157 A1* | 10/2018 | Khe | H01L 51/0048 |
| 2019/0143296 A1* | 5/2019 | Choi | B01J 20/28033 95/51 |
| 2020/0009510 A1 | 1/2020 | Miyahara et al. | |
| 2021/0322932 A1* | 10/2021 | Ichikawa | B01D 71/028 |

FOREIGN PATENT DOCUMENTS

| | | | |
|---|---|---|---|
| JP | 2981884 B1 | | 11/1999 |
| JP | 2002201020 A | * | 7/2002 |
| JP | 2002-263457 A1 | | 9/2002 |
| JP | 2002-348579 A1 | | 12/2002 |
| JP | 2005-074382 A1 | | 3/2005 |
| JP | 3922389 B2 | | 5/2007 |
| WO | 2005/014481 A1 | | 2/2005 |
| WO | 2018/180211 A1 | | 10/2018 |

OTHER PUBLICATIONS

Chinese Office Action (Application No. 201980006596.7) dated Nov. 18, 2021.

International Search Report and Written Opinion (Application No. PCT/JP2019/003911) dated Mar. 12, 2019.

English translation of the International Preliminary Report on Patentability (Chapter I) (Application No. PCT/JP2019/003911) dated Oct. 15, 2020.

* cited by examiner

ZEOLITE MEMBRANE COMPLEX, METHOD FOR PRODUCING ZEOLITE MEMBRANE COMPLEX, AND SEPARATION METHOD

CROSS-REFERENCE TO RELATED APPLICATION

The present application is a continuation application of International Application No. PCT/JP2019/003911, filed on Feb. 4, 2019, which claims priority to Japanese Patent Application No. 2018-067396, filed on Mar. 30, 2018. The contents of these applications are incorporated herein by reference in their entirety.

TECHNICAL FIELD

The present invention relates to a zeolite membrane complex, a method for producing a zeolite membrane complex, and a separation method of a mixture using a zeolite membrane complex.

BACKGROUND ART

Currently, various kinds of research is being conducted on and developments being made in applications of a zeolite membrane complex obtained by forming a zeolite membrane on a support, such as separation of specific molecules and adsorption of molecules through a molecular sieving action of zeolite.

Japanese Patent No. 3922389 (Document 1) describes that, in order to obtain an excellent molecular sieving action of a zeolite membrane, it is important not to allow pores with a size larger than that of the pores of zeolite to be formed at a grain boundary between zeolite crystals of the zeolite membrane. The grain boundary of the zeolite membrane is an oxide with a density larger than that of zeolite crystals.

Japanese Patent No. 2981884 (Document 2) discloses a technique in which raw materials of a zeolite membrane are divided into two liquids, the raw material liquids are introduced into pores of a porous body from two sides so that a boundary between the two liquids is formed in the pores, and a zeolite membrane is formed in the pores through hydrothermal synthesis. In this case, zeolite crystals are precipitated in the pores of the porous body, and thus it is sufficient to form very small crystals and a less-defective zeolite membrane with high separating performance can be formed.

JP 2002-263457A (Document 3) discloses a technique for selectively repairing voids, cracks, and pinholes at a grain boundary phase of a zeolite membrane, by bringing a coupling agent into contact with one face of the zeolite membrane, and bringing water or steam into contact with the other face.

A zeolite membrane according to JP 2002-348579A (Document 4) has pores unique to zeolite crystals, and has pores at a crystal grain boundary. The pore size at the crystal grain boundary is larger than that of the pores unique to zeolite crystals and is 10 nm or less. With the zeolite membrane, a hydrocarbon mixture is efficiently separated into a component that is rich in linear hydrocarbon and a component that is rich in branched hydrocarbon.

Incidentally, when actually using a zeolite membrane for separation of molecules, adsorption of molecules, or the like, the zeolite membrane is required to have high permeability and high separating performance, and high durability in a usage environment. However, although research has been conducted on the influence of a grain boundary phase on temporary permeability of a zeolite membrane, no research has been conducted on the influence of a grain boundary phase on the durability of a zeolite membrane.

SUMMARY OF INVENTION

It is an object of the present invention to realize high permeability and high separating performance, and high durability of a zeolite membrane.

The present invention is directed to a zeolite membrane complex. A zeolite membrane complex according to a preferred mode of the present invention includes: a porous support; and a zeolite membrane formed on the support. The zeolite membrane includes a zeolite crystal phase constituted by a plurality of zeolite crystals, and a dense grain boundary phase, which is a region between the plurality of zeolite crystal. A density of at least part of the grain boundary phase is smaller than a density of the zeolite crystal phase. A width of the grain boundary phase is 2 nm or more and 10 nm or less. According to the present invention, it is possible to realize high permeability and high separating performance, and high durability of a zeolite membrane.

It is preferable that the width of the grain boundary phase is 5 times or more and 27 times or less a pore size of the zeolite crystals contained in the zeolite crystal phase.

It is preferable that the width of the grain boundary phase is 0.005 times or more and 0.12 times or less an average particle size of zeolite particles in the zeolite membrane.

It is preferable that the grain boundary phase is constituted by an inorganic substance.

It is preferable that the grain boundary phase contains an amorphous substance.

It is preferable that an area of a portion of the grain boundary phase with a density that is smaller than a density of the zeolite crystal phase is 10% or more of an area of the entire grain boundary phase.

The present invention is also directed to a method for producing a zeolite membrane complex. A method for producing a zeolite membrane complex according to a preferred mode of the present invention includes the steps of: a) preparing a seed crystal; b) attaching the seed crystal to a porous support; and c) immersing the support in a raw material solution, and causing zeolite to grow from the seed crystal through hydrothermal synthesis, thereby forming a zeolite membrane on the support. The zeolite membrane includes a zeolite crystal phase constituted by a plurality of zeolite crystals, and a dense grain boundary phase, which is a region between the plurality of zeolite crystals. A density of at least part of the grain boundary phase is smaller than a density of the zeolite crystal phase. A width of the grain boundary phase is 2 nm or more and 10 nm or less. According to the present invention, it is possible to realize high permeability and high separating performance, and high durability of a zeolite membrane.

It is preferable that, in the step c), solvent of the raw material solution does not contain an amine other than a structure-directing agent.

It is preferable that, in the step c), solvent of the raw material solution contains alcohol.

The present invention is also directed to a separation method. A separation method according to a preferred mode of the present invention includes the steps of: a) preparing the above-described zeolite membrane complex; and b) supplying a mixture containing a plurality of types of gases or liquids to the zeolite membrane complex, and allowing a substance with high permeability in the mixture to permeate the zeolite membrane complex, thereby separating the substance from other substances.

It is preferable that the mixture contains at least one of hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, etone, and aldehyde.

These and other objects, features, aspects and advantages of the present invention will become more apparent from the following detailed description of the present invention when taken in conjunction with the accompanying drawings.

DESCRIPTION OF EMBODIMENTS

Figure 1:
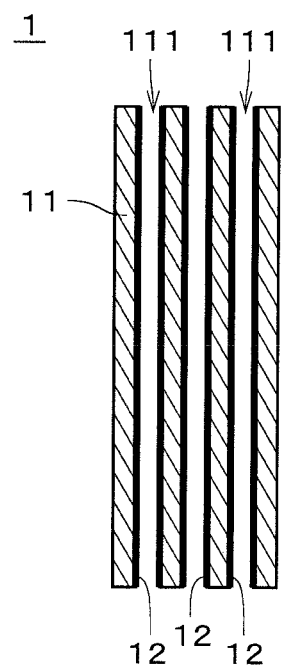
FIG. 1 is a cross-sectional view of a zeolite membrane complex.

FIG. 1 is a cross-sectional view of a zeolite membrane complex 1 according to an embodiment of the present invention. The zeolite membrane complex 1 includes a support 11, and zeolite membranes 12 formed on the support 11. In the example shown in FIG. 1, the support 11 is a monolith support substantially in the shape of a solid cylinder through which a plurality of through holes 111 extend in the longitudinal direction (i.e., the upper-lower direction in the drawing). A cross-section that is perpendicular to the longitudinal direction of each of the through holes 111 (i.e., cells) is, for example, substantially circular. In FIG. 1, the diameter of each through hole 111 is larger than the actual diameter, and the number of through holes 111 is smaller than the actual number. The zeolite membranes 12 are formed on the inner faces of the through holes 111, and cover substantially the entire inner faces of the through holes 111. In FIG. 1, the zeolite membranes 12 are indicated by thick lines.

The length (i.e., length in the upper-lower direction in the drawing) of the support 11 is, for example, 10 cm to 200 cm. The outer diameter of the support 11 is, for example, 0.5 cm to 30 cm. The center-to-center distance between adjacent through holes 111 is, for example, 0.3 mm to 10 mm. The surface roughness (Ra) of the support 11 is, for example, 0.1 µm to 5.0 µm, and preferably 0.2 µm to 2.0 µm. Note that the support 11 may be in the shape of, for example, honeycomb, a flat plate, a tube, a cylinder, a solid cylinder, a polygonal prism, or the like. If the support 11 is in the shape of a tube, the thickness of the support 11 is, for example, 0.1 mm to 10 mm.

In this embodiment, the support 11 is a porous material that gas or liquid (i.e., fluid) can permeate through, and the zeolite membranes 12 are molecular separation membranes for separating, through a molecular sieving action, a specific substance from a mixed fluid in which a plurality of types of substances are mixed. For example, the zeolite membranes 12 may be used as gas separation membranes for separating a specific gas from a mixed gas containing a plurality of types of gases. Furthermore, the zeolite membranes 12 may also be used as liquid separation membranes for separating a specific liquid from a mixed liquid containing a plurality of types of liquids. The zeolite membranes 12 may also be used as separation membranes for separating a specific substance from a mixed fluid in which a gas and a liquid are mixed. Alternatively, the zeolite membranes 12 may also be used as osmotic evaporating membranes. It is also possible to use the zeolite membrane complex 1 for other applications.

As the material for forming the support 11, various materials may be used, as long as they are chemically stable in the step of forming the zeolite membranes 12 on the surface. The material for forming the support 11 may be, for example, sintered ceramic, metal, organic polymer, glass, carbon, or the like. Examples of the sintered ceramic include alumina, silica, mullite, zirconia, titania, yttria, silicon nitride, silicon carbide, and the like. Examples of the metal include aluminum, iron, bronze, stainless steel, and the like. Examples of the organic polymer include polyethylene, polypropylene, polytetrafluoroethylene, polysulfone, polyimide, and the like. In this embodiment, the support 11 contains at least one of alumina, silica, and mullite.

The support 11 may contain an inorganic binding agent. As the inorganic binding agent, at least one of titania, mullite, easily sinterable alumina, silica, glass frit, a clay mineral, and easily sinterable cordierite may be used.

If the zeolite membranes 12 are used as separation membranes, preferably, the average pore size of the support 11 at a portion thereof near the surface on which the zeolite membranes 12 are formed is smaller than the average pore size of the other portions. In order to realize such a structure, the support 11 has a multi-layered structure. If the support 11 has a multi-layered structure, the materials for forming the respective layers may be those described above, and may be the same or different from each other. The average pore size of the support 11 can be measured by using a mercury porosimeter, a perm porometer, a nano-perm porometer, or the like.

The average pore size of the support 11 is, for example, 0.01 µm to 70 µm, and preferably 0.05 µm to 25 µm. The average pore size of the support 11 at a portion thereof near the surface on which the zeolite membranes 12 are formed is 0.01 µm to 1 µm, and preferably 0.05 µm to 0.5 µm. The average pore size can be measured by using, for example, a mercury porosimeter, a perm porosimeter, or a nano-perm porosimeter. Regarding the pore size distribution of the entirety including the surface and the inside of the support 11, D5 is, for example, 0.01 µm to 50 µm, D50 is, for example, 0.05 µm to 70 µm, and D95 is, for example, 0.1 µm to 2000 µm. The porosity of the support 11 at a portion thereof near the surface on which the zeolite membranes 12 are formed is, for example, 20% to 60%.

The support 11 has, for example, a multi-layered structure in which a plurality of layers with difference average pore sizes are layered in the thickness direction. The average pore size and the sintered grain size at a surface layer including the surface on which the zeolite membranes 12 are formed are smaller than the average pore size and the sintered grain size at layers other than the surface layer. The average pore size at the surface layer of the support 11 is, for example, 0.01 µm to 1 µm, and preferably 0.05 µm to 0.5 µm. If the support 11 has a multi-layered structure, the materials for forming the respective layers may be those described above. The materials for forming the plurality of layers constituting the multi-layered structure may be the same or different from each other.

The thickness of the zeolite membranes 12 is, for example, 0.05 µm to 30 µm, preferably 0.1 µm to 20 µm, and more preferably 0.5 μm to 10 μm. If the thickness of the zeolite membranes 12 is increased, the separating performance increases. If the thickness of the zeolite membranes 12 is reduced, the permeability rate increases. The surface roughness (Ra) of the zeolite membranes 12 is, for example, 5 μm or less, preferably 2 μm or less, more preferably 1 μm or less, and even more preferably 0.5 μm or less.

Figure 2:
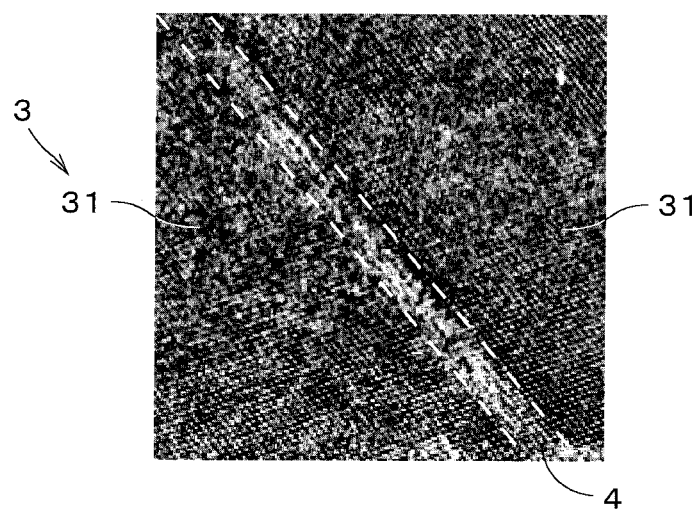
FIG. 2 is an enlarged view of a zeolite membrane.

FIG. 2 is an enlarged view obtained by using a transmission electron microscope (TEM) to observe a polished face formed by polishing a zeolite membrane 12. FIG. 2 shows part of a polished face of the zeolite membrane 12. As shown in FIG. 2, the zeolite membrane 12 includes a zeolite crystal phase 3 constituted by a plurality of zeolite crystals 31, and a grain boundary phase 4, which is a region between the plurality of zeolite crystals 31. In FIG. 2, the approximate positions of the boundaries between the zeolite crystals 31 and the grain boundary phase 4 are indicated by broken lines.

There is no particular limitation on the type of the zeolite crystals 31, but, if the zeolite membrane 12 is to be used as a separation membrane, the maximum number of membered rings of the zeolite crystals 31 is preferably 6 or 8 in view of the amount of permeant substance that can permeate the membrane and the separating performance. The maximum number of membered rings of the zeolite crystals 31 is more preferably 8.

The zeolite crystals 31 are, for example, DDR-type zeolite. In other words, the zeolite crystals 31 are zeolite whose structure code as defined by the International Zeolite Association is "DDR". The zeolite crystals 31 are not limited to DDR-type zeolite, and may also be zeolite with other structures. The zeolite crystals 31 may be, for example, AEI-type, AEN-type, AFN-type, AFV-type, AFX-type, BEA-type, CHA-type, DDR-type, ERI-type, ETL-type, FAU-type (X-type, Y-type), GIS-type, LEV-type, LTA-type, MEL-type, MFI-type, MOR-type, PAU-type, RHO-type, SAT-type, or SOD-type zeolite. More preferably, the zeolite crystals 31 are, for example, AE-type, AFN-type, AFV-type, AFX-type, CHA-type, DDR-type, ERI-type, ETL-type, GIS-type, LEV-type, LTA-type, PAU-type, RHO-type, or SAT-type zeolite. Even more preferably, the zeolite crystals 31 are, for example, AEI-type, AFN-type, AFV-type, AFX-type, CHA-type, DDR-type, ERI-type, ETL-type, GIS-type, LEV-type, PAU-type, RHO-type, or SAT-type zeolite.

The zeolite constituting the zeolite membrane 12 contains, for example, Al as a T-atom. As the zeolite constituting the zeolite membrane 12, zeolite in which atoms (T-atoms) located at the center of an oxygen tetrahedron ($TO_4$) constituting the zeolite are silicon (Si) and aluminum (Al), AlPO-type zeolite in which T-atoms are Al and phosphorus (P), SAPO-type zeolite in which T-atoms are Si, Al, and P, MAPSO-type zeolite in which T-atoms are magnesium (Mg), Si, Al, and P, ZnAPSO-type zeolite in which T-atoms are zinc (Zn), Si, Al, and P, and the like may be used. Some T-atoms may be substituted by other elements.

The zeolite membrane 12 contains, for example, Si. The zeolite membrane 12 may contain, for example, any two or more of Si, Al, and P. The zeolite membrane 12 may contain an alkali metal. The alkali metal is, for example, sodium (Na) or potassium (K). If the zeolite membrane 12 contains an Si atom, the Si/Al ratio in the zeolite membrane 12 is, for example, 1 or more and 100,000 or less. The Si/Al ratio is preferably 5 or more, more preferably 20 or more, and even more preferably 100 or more, that is, the higher the ratio the better. It is possible to adjust the Si/Al ratio in the zeolite membrane 12, by adjusting the mixing proportion of an Si source and an Al source in a later-described raw material solution or the like.

In the zeolite membrane 12, the unique pore size of the zeolite crystals 31 is, for example, 0.36 nm×0.44 nm, and the average pore size is 0.40 nm. The unique pore size of the zeolite crystals 31 is smaller than the pore size of the support 11.

The grain boundary phase 4 is a phase containing an amorphous substance (i.e., an amorphous solid) and/or crystals other than the zeolite crystals 31. Preferably, the grain boundary phase 4 contains an amorphous substance. More preferably, the grain boundary phase 4 contains 10 wt % or more of an amorphous substance. Furthermore, the grain boundary phase 4 is preferably constituted by an inorganic substance. In other words, it is preferable that the grain boundary phase 4 is constituted only by an inorganic substance, and does not substantially contain an organic substance. "Not substantially contain an organic substance" refers to a state in which an organic substance is not contained in an amount of 5 wt % or more.

The grain boundary phase 4 is a dense phase. The dense phase refers to a phase that does not substantially have a pore whose pore size is larger than the pore size of the zeolite crystals 31. The pore size of the zeolite crystals 31 refers to an average of the longer axis and the shorter axis of the unique pore size of the zeolite crystals 31.

The width of the grain boundary phase 4 is 2 nm to 10 nm, preferably 2 nm to 8 nm, and more preferably 2 nm to 6 nm. The width of the grain boundary phase 4 is obtained as follows. First, a polished face of the zeolite membrane 12 is observed using a TEM, and one zeolite crystal 31 is focused on. Then, the distance (hereinafter, referred to as an "inter-crystal distance") between the zeolite crystal 31 which is focused on (hereinafter, referred to as a "focused zeolite crystal 31") and a zeolite crystal 31 adjacent to the focused zeolite crystal 31 is measured from the peripheral edge of the focused zeolite crystal 31. The inter-crystal distance is a width of a portion with the largest width in a region between the focused zeolite crystal 31 and the adjacent zeolite crystal 31 (a region with low darkness between the zeolite crystals 31, in FIG. 2). The peripheral edge of one focused zeolite crystal 31 is divided into four portions along the major axis and the minor axis of the focused zeolite crystal 31, the inter-crystal distance at one point is measured for each of the four peripheral edge portions, and an average of the four inter-crystal distances is taken as an average inter-crystal distance of the focused zeolite crystal 31. For example, if the focused zeolite crystal 31 is substantially in the shape of a rectangle in a TEM image, the four points are respectively on the four sides of the focused zeolite crystal 31. Average inter-crystal distances in the case in which ten zeolite crystals 31 are taken as focused zeolite crystals 31 are obtained, and an average of the ten average inter-crystal distances is taken as the width of the grain boundary phase 4.

The width of the grain boundary phase 4 is preferably 5 times to 27 times the pore size (i.e., the average of the longer axis and the shorter axis of the unique pore size) of the zeolite crystals 31. The width of the grain boundary phase 4 is more preferably 5 times to 20 times the pore size of the zeolite crystals 31, and even more preferably 5 times to 15 times the pore size of the zeolite crystals 31.

The width of the grain boundary phase 4 is preferably 0.005 times to 0.12 times the average particle size of the zeolite particles in the zeolite membrane 12. The width of the grain boundary phase 4 is more preferably 0.005 times to 0.045 times the average particle size of the zeolite particles, and even more preferably 0.005 times to 0.02 times the average particle size. In the zeolite membrane 12, the average particle size of the zeolite particles is 90 nm to 370 nm. The average particle size of the zeolite particles is obtained by using a TEM to observe a polished face formed by polishing the zeolite membrane 12, and averaging particle sizes of any ten zeolite particles. The particle size of each zeolite particle is obtained as an average of the maximum diameter and the minimum diameter of the zeolite particle.

The density of at least part of the grain boundary phase 4 is smaller than the density of the zeolite crystal phase 3. The area of a portion (hereinafter, referred to as a "low-density portion") of the grain boundary phase 4 with a density that is smaller than the density of the zeolite crystal phase 3 is preferably 10% or more of the area of the entire grain boundary phase 4. When the proportion of the area of the low-density portion with respect to the area of the entire grain boundary phase 4 is referred to as a "low density proportion", the low density proportion is more preferably 20% or more, and even more preferably 30% or more. There is no particular limitation on the upper limit of the low density proportion of the grain boundary phase 4, but the low density proportion is typically 100% or less, and more typically 95% or less.

The magnitude relationship between the density of the grain boundary phase 4 and the density of the zeolite crystal phase 3 is obtained by comparing the darkness levels of the grain boundary phase 4 and the zeolite crystal phase 3 in a TEM image of a polished face of the zeolite membrane 12. Specifically, if the grain boundary phase 4 is darker than (i.e., has a higher darkness level than) the zeolite crystal phase 3 in a TEM image, the density of the grain boundary phase 4 is larger than the density of the zeolite crystal phase 3. On the other hand, if the grain boundary phase 4 is lighter than (i.e., has a lower darkness level than) the zeolite crystal phase 3 in a TEM image, the density of the grain boundary phase 4 is smaller than the density of the zeolite crystal phase 3.

Furthermore, the low density proportion is obtained as follows. First, in a TEM image of a polished face of the zeolite membrane 12, any one zeolite crystal 31 is selected, and the region containing the grain boundary phase 4 between the selected zeolite crystal 31 and all zeolite crystals 31 adjacent to the zeolite crystal 31 is selected, and the region is binarized with respect to a predetermined threshold. The threshold is determined as appropriate such that the selected zeolite crystal 31 and the grain boundary phase 4 can be identified. Then, based on the image of the binarized region, an area of a portion with a darkness that is lower than the threshold and an area of a portion with a darkness that is equal to or higher than the threshold are obtained from the grain boundary phase 4. That is to say, in the grain boundary phase 4, an area of a portion with a density that is smaller than the density of the zeolite crystal phase 3 and an area of a portion with a density that is equal to or greater than the density of the zeolite crystal phase 3 are obtained. Then, the low density proportion in this region is calculated using these areas. In this embodiment, an average of low density proportions respectively obtained for ten regions in a TEM image is taken as the low density proportion of the grain boundary phase 4 of the zeolite membrane 12.

Figure 3:
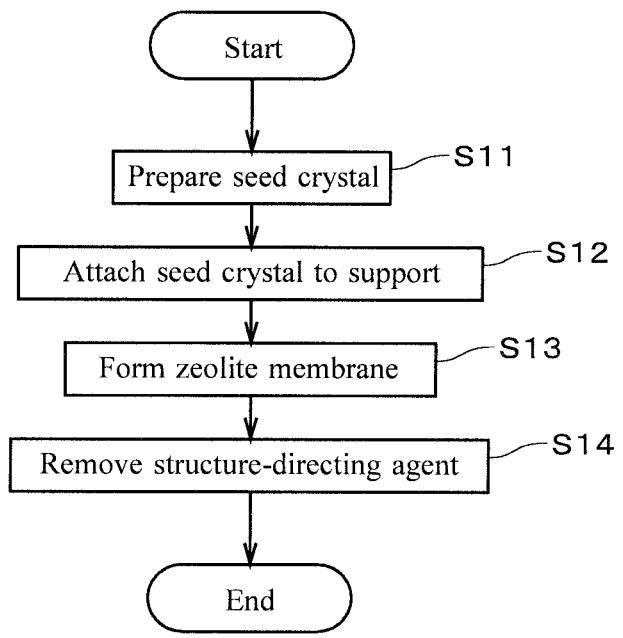
FIG. 3 is a chart showing the flow of production of a zeolite membrane complex.

Next, the flow of production of the zeolite membrane complex 1 will be described with reference to FIG. 3. First, a seed crystal that is used to produce the zeolite membranes 12 is prepared (step S11). The seed crystal is obtained from, for example, a DDR-type zeolite powder produced through hydrothermal synthesis. The zeolite powder may be used as a seed crystal as is, or a seed crystal may be obtained by processing the powder through pulverization or the like.

Then, the porous support 11 is immersed in a solution in which the seed crystal is dispersed, so that the seed crystal is attached to the support 11 (step S12). Alternatively, a solution in which the seed crystal is dispersed is brought into contact with a portion of the support 11 on which the zeolite membranes 12 are to be formed, so that the seed crystal is attached to the support 11. Accordingly, a support to which a seed crystal has been attached is produced. The seed crystal may be attached to the support 11 using other methods.

The support 11 to which the seed crystal has been attached is immersed in a raw material solution. The raw material solution is produced, for example, by dissolving an Si source, an Al source, a structure-directing agent (hereinafter, also referred to as "SDA"), and the like in a solvent. It is preferable that the solvent of the raw material solution preferably contains an alcohol such as ethanol. Furthermore, it is preferable that the solvent does not substantially contain an amine (i.e., amine such as ethylenediamine) other than a structure-directing agent. Note that "not substantially contain an amine other than a structure-directing agent" refers to a state in which the concentration of an amine other than a structure-directing agent in the solvent is 0.05 mol % or less. The composition of the raw material solution is, for example, 1.00 $SiO_2$:0 $Al_2O_3$:0.015 SDA:0.16 $CH_3CH_2OH$. As the SDA contained in the raw material solution, for example, 1-adamantanamine may be used.

Then, DDR-type zeolite is caused to grow from the seed crystal acting as a core through hydrothermal synthesis, so that DDR-type zeolite membranes 12 are formed on the support 11 (step S13). The temperature during the hydrothermal synthesis is preferably 120 to 200° C., and is, for example, 160° C. The time for the hydrothermal synthesis is preferably 4 to 100 hours, and is, for example, 30 hours. At this time, it is possible to adjust the composition of the DDR-type zeolite membranes 12, by adjusting the mixing proportion of an Si source and an Al source in a raw material solution or the like.

When the hydrothermal synthesis has ended, the support 11 and the zeolite membranes 12 are washed with ion-exchanged water. After washing, the support 11 and the zeolite membranes 12 are dried, for example, at 80° C. When the support 11 and the zeolite membranes 12 are dried, the SDA is removed through combustion by heating the zeolite membranes 12, so that pores are formed extending through the zeolite membranes 12 (step S14). The heating temperature and the heating time of the zeolite membranes 12 are, for example, 450° C. and 50 hours. Accordingly, the above-described zeolite membrane complex 1 is obtained. Note that, if no SDA is used in the production of the zeolite membranes 12, the removal of the SDA through combustion in step S14 is omitted.

Figure 4:
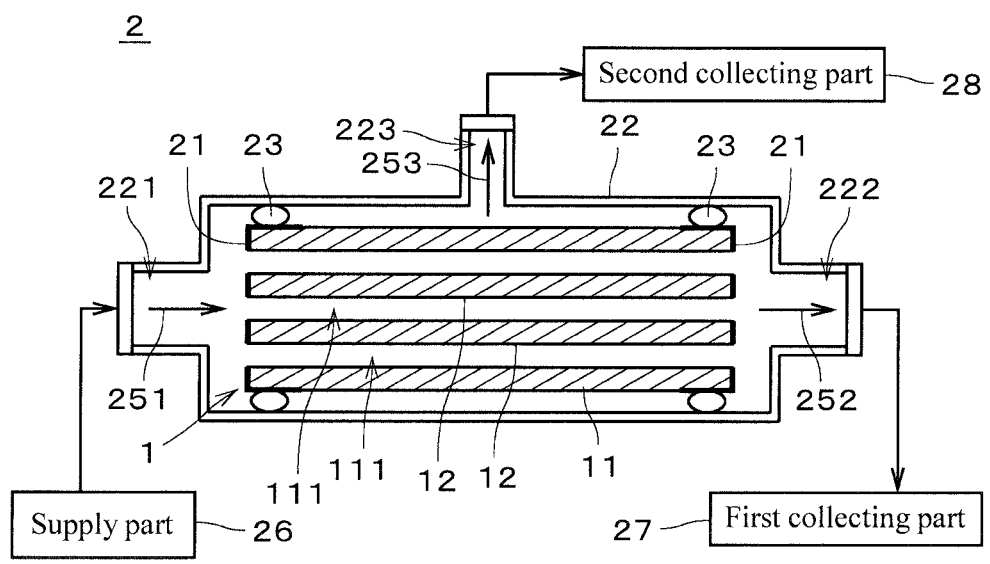
FIG. 4 is a diagram showing a separating apparatus.
Figure 5:
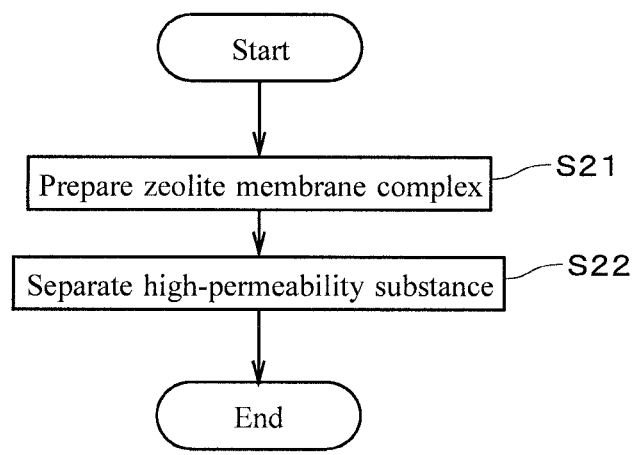
FIG. 5 is a chart showing the flow of separation of a mixture.

Next, separation of a mixture using the zeolite membrane complex 1 will be described with reference to FIGS. 4 and 5. FIG. 4 is a diagram showing a separating apparatus 2. FIG. 5 is a chart showing the flow of separation of a mixture using the separating apparatus 2.

In the separating apparatus 2, a mixture containing a plurality of types of fluids (i.e., gases or liquids) is supplied to the zeolite membrane complex 1, and a substance with high permeability in the mixture is allowed to permeate the zeolite membrane complex 1, so that the substance is separated from other substances. Separation in the separating apparatus 2 may be performed, for example, in order to extract a substance with high permeability from a mixture, or in order to concentrate a substance with low permeability.

As described above, the mixture (i.e., mixed fluid) may be a mixed gas containing a plurality of types of gases, may be a mixed liquid containing a plurality of types of liquids, or may be a gas-liquid two-phase fluid containing both a gas and a liquid.

In the separating apparatus 2, the amount of $CO_2$ that permeates the zeolite membrane complex 1 (permeance) at 20° C. to 400° C. is, for example, 100 nmoVm²·s·Pa or more. Furthermore, the ratio between the amount of $CO_2$ that permeates the zeolite membrane complex 1/the amount of $CH_4$ that leaks (permeance ratio) at 20° C. to 400° C. is, for example, 100 or more. The permeance and the permeance ratio are those in a case in which the partial pressure difference of $CO_2$ between the supply side and the permeation side of the zeolite membrane complex 1 is 1.5 MPa.

The mixture contains at least one of, for example, hydrogen ($H_2$), helium (He), nitrogen ($N_2$), oxygen ($O_2$), water ($H_2O$), steam ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

The nitrogen oxide is a compound of nitrogen and oxygen. The above-described nitrogen oxide is, for example, a gas called NOx such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

The sulfur oxide is a compound of sulfur and oxygen. The above-described sulfur oxide is, for example, a gas called $SO_X$ such as sulfur dioxide ($SO_2$), or sulfur trioxide ($SO_3$).

The sulfur fluoride is a compound of fluorine and sulfur. The above-described sulfur fluoride is, for example, disulfur difluoride (F—S—S—F,S=$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with 1 or more and 8 or less carbon atoms. The C3 to C8 hydrocarbons may be any of a linear-chain compound, a side-chain compound, and a ring compound. Furthermore, the C3 to C8 hydrocarbons may either be a saturated hydrocarbon (i.e., in which there is no double bond and triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also called thiol or thioalcohol. The above-described mercaptans is, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether (($CH_3)_2O$), methyl ethyl ether ($C_2H_5OCH_3$), diethyl ether (($C2H_5)_2O$), or the like.

The above-described ketone is, for example, acetone (($CH_3)_2CO$), methyl ethyl ketone ($C_2H_5COCH_3$), diethyl ketone (($C2H_5)_2CO$), or the like.

The above-described aldehyde is, for example, acetaldehyde ($CH_3CHO$), propionaldehyde ($C_2H_5CHO$), butanal (butylaldehyde) ($C_3H_7CHO$), or the like.

In the described below, a mixture that is separated by the separating apparatus 2 will be described as a mixed liquid containing a plurality of types of liquids, which is to be separated through pervaporation.

The separating apparatus 2 includes the zeolite membrane complex 1, sealing portions 21, an outer tube 22, sealing members 23, a supply part 26, a first collecting part 27, and a second collecting part 28. The zeolite membrane complex 1, the sealing portions 21, and the sealing members 23 are accommodated in the outer tube 22. The supply part 26, the first collecting part 27, and the second collecting part 28 are arranged outside the outer tube 22, and are connected to the outer tube 22.

The sealing portions 21 are members that are attached to both end portions in the longitudinal direction of the support 11 of the zeolite membrane complex 1, and that cover and seal both end faces in the longitudinal direction of the support 11. The sealing portions 21 prevent a liquid from flowing into or out from both end faces of the support 11. The sealing portions 21 are, for example, plate-like members made of glass. The material and the shape of the sealing portions 21 may be changed as appropriate. Note that both ends in the longitudinal direction of the through holes 111 of the support 11 are not covered by the sealing portions 21. Accordingly, a mixed liquid can flow into and out of the through holes 111 from both ends thereof.

The outer tube 22 is a tubular member substantially in the shape of a cylinder. The longitudinal direction (i.e., the left-right direction in the drawing) of the zeolite membrane complex 1 is substantially parallel to the longitudinal direction of the outer tube 22. A supply port 221 is provided at an end portion on one side in the longitudinal direction of the outer tube 22 (i.e., an end portion on the left side in the drawing), and a first discharge port 222 is provided at an end portion on the other side. A second discharge port 223 is provided on a side face of the outer tube 22. The internal space of the outer tube 22 is an enclosed space that is isolated from the space around the outer tube 22.

The supply part 26 is connected to the supply port 221. The supply part 26 supplies a mixed liquid via the supply port 221 to the internal space of the outer tube 22. The supply part 26 includes, for example, a pump for pressure-feeding a mixed liquid toward the outer tube 22, and a temperature adjuster for heating the mixed liquid. The first collecting part 27 is connected to the first discharge port 222. The second collecting part 28 is connected to the second discharge port 223. The second collecting part 28 includes, for example, a cooling device for cooling vapor collected via the outer tube 22 and liquefying the vapor, and a storage vessel for storing the liquid.

The sealing members 23 are arranged around the entire circumferences at portions near both ends in the longitudinal direction of the zeolite membrane complex 1, between the outer face of the zeolite membrane complex 1 (i.e., the outer face of the support 11) and the inner face of the outer tube 22. The sealing members 23 are substantially ring-like members made of a material that liquid and vapor cannot permeate through. The sealing members 23 are, for example, O-rings made of flexible resin. The sealing members 23 come into close contact with the outer face of the zeolite membrane complex 1 and the inner face of the outer tube 22 around the entire circumferences thereof. The portions between the sealing members 23 and the outer face of the zeolite membrane complex 1, and between the sealing members 23 and the inner face of the outer tube 22 are sealed, and do not allow liquid or vapor to pass through them.

When separating a mixed liquid, the above-described separating apparatus 2 is prepared, and thus the zeolite membrane complex 1 is prepared (step S21). Then, a mixed liquid containing a plurality of types of liquids with different permeabilities through the zeolite membranes 12 is supplied by the supply part 26 to the internal space of the outer tube 22. For example, the mixed liquid mainly contains water and ethanol. The mixed liquid may contain a liquid other than water and ethanol. The temperature of the mixed liquid that is supplied from the supply part 26 to the internal space of the outer tube 22 is, for example, 40° C. to 160° C. Furthermore, the pressures in the internal space of the outer tube 22 on the side connected to the second collecting part 28 (i.e., the space that is on the outer side in the radial direction of the outer face of the support 11) and the internal space of the second collecting part 28 are reduced, and the pressures in these internal spaces are, for example, 10 torr to 200 torr.

The mixed liquid that is supplied from the supply part 26 to the outer tube 22 is introduced from the left end in the drawing of the zeolite membrane complex 1 into the through holes 111 of the support 11, as indicated by the arrow 251. A liquid with high permeability in the mixed liquid (which is, for example, water, and hereinafter is referred to as a "high-permeability substance") permeates the zeolite membranes 12 respectively formed on the inner faces of the through holes 111, and the support 11, and is collected from the outer face of the support 11 as vapor. Accordingly, the high-permeability substance is separated from a liquid with low permeability in the mixed liquid (which is, for example, ethanol, and hereinafter is referred to as a "low-permeability substance") (step S22). The vapor collected from the outer face of the support 11 (i.e., the high-permeability substance) is guided via the second discharge port 223 to the second collecting part 28 as indicated by the arrow 253, and is cooled and collected as liquid in the second collecting part 28.

Furthermore, a liquid other than the liquid that has permeated the zeolite membranes 12 and the support 11 (hereinafter, referred to as a "non-permeant substance") in the mixed liquid is allowed to pass from the left side to the right side in the drawing through the through holes 111 of the support 11, and is collected via the first discharge port 222 to the first collecting part 27 as indicated by the arrow 252. The non-permeant substance may contain, in addition to the above-described low-permeability substance, a high-permeability substance that has not permeated the zeolite membranes 12.

Next, Examples 1 to 4 and Comparative Examples 1 and 2 indicating a relationship between the durability of the separating performance of the zeolite membranes 12 and the grain boundary phases 4 of the zeolite membranes 12 will be described with reference to Table 1. Table 1 shows molar fractions of the raw material solution components that are used to form DDR-type zeolite membranes 12 on the support 11 (step S13). The molar fractions of the raw materials in Examples 1 to 4 and Comparative Examples 1 and 2 are different. Table 2 shows characteristics of the grain boundary phases 4 of the zeolite membranes 12 that are formed using the raw material solutions in Examples 1 to 4 and Comparative Examples 1 and 2. Table 3 shows durabilities of the separating performances of the zeolite membranes 12.

The separating performances in Table 3 were evaluated using the above-described separating apparatus 2 through pervaporation. In this evaluation, a mixed liquid with water concentration/ethanol concentration=50 wt %/50 wt % at 50° C. was supplied from the supply part 26 to the outer tube 22 (the arrow 251). Furthermore, the pressures of the internal space of the outer tube 22 on the side connected to the second collecting part 28, and the internal space of the second collecting part 28 were reduced to 50 torr. The vapor collected from the outer face of the support 11 (the arrow 253) was cooled and collected as liquid in the second collecting part 28. Then, the concentrations of water and ethanol collected by the second collecting part 28 were measured, and the water concentration/ethanol concentration was obtained as separating performance.

The durabilities were evaluated by immersing the zeolite membrane complex 1 in a pH9 buffer solution at 85° C. The pH9 buffer solution was an aqueous solution containing about 0.31 wt % of boric acid ($B(OH)_3$), about 0.37 wt % of potassium chloride (KCl), and about 0.09 wt % of sodium hydroxide (NaOH). In this evaluation, the zeolite membrane complex 1 was immersed in a pH9 buffer solution for a predetermined period of time (200 hours and 400 hours in Table 3), and then was washed with ion-exchanged water, and dried at 80° C. for 12 hours or more. Subsequently, the separating performances were measured again using the separating apparatus 2 through pervaporation, and the percentages of a decrease in the separating performances after immersion relative to the separating performances before immersion were taken as durability indices.

TABLE 1

| | Ethanol (mol %) | Ethylene-diamine (mol %) | Water (mol %) | $SiO_2$ (mol %) | 1-Adamantanamine (mol %) |
|---|---|---|---|---|---|
| Ex. 1 | 0.10 | 0.00 | 99.08 | 0.81 | 0.01 |
| Ex. 2 | 0.24 | 0.00 | 97.86 | 1.87 | 0.03 |
| Ex. 3 | 0.39 | 0.00 | 96.55 | 3.02 | 0.04 |
| Ex. 4 | 0.56 | 0.00 | 94.85 | 4.52 | 0.07 |
| Com. Ex. 1 | 0.00 | 0.13 | 99.05 | 0.81 | 0.01 |
| Com. Ex. 2 | 0.00 | 0.73 | 94.69 | 4.51 | 0.07 |

TABLE 2

| | Width of grain boundary phase (nm) | Width of grain boundary phase/ Pore size of zeolite crystals | Width of grain boundary phase/ average particle size of zeolite particles |
|---|---|---|---|
| Ex. 1 | 2.1 | 4.8 | 0.005 |
| Ex. 2 | 5.8 | 15.5 | 0.021 |
| Ex. 3 | 7.9 | 20.3 | 0.045 |
| Ex. 4 | 10.0 | 27.0 | 0.120 |
| Com. Ex. 1 | 16.8 | 42.0 | 0.045 |
| Com. Ex. 2 | 29.0 | 72.5 | 0.322 |

TABLE 3

| | Percentages of decrease of separating performance | |
|---|---|---|
| | After immersion for 200 hr (%) | After immersion for 400 hr (%) |
| Ex. 1 | 0 | 0 |
| Ex. 2 | 0 | 0 |
| Ex. 3 | 0 | 0 |
| Ex. 4 | 1 | 2 |
| Com. Ex. 1 | 2 | 6 |
| Com. Ex. 2 | 18 | 42 |

In Examples 1 to 4, the solvent of the raw material solution contains ethanol but does not contain ethylenediamine. The widths of the grain boundary phases in Examples 1 to 4 were 2 nm to 10 nm. In Examples 1 to 4, the percentages of a decrease in the separating performances after immersion in a pH9 buffer solution for 200 hours and after immersion for 400 hours were almost 0%. On the other hand, in Comparative Examples 1 and 2, the solvent of the raw material solution contains ethylenediamine but does not contain ethanol. The widths of the grain boundary phases in Comparative Examples 1 and 2 were more than 10 nm. In Comparative Example 1, the percentage of a decrease in the separating performance after immersion in a pH9 buffer solution for 400 hours was 5% or more. In Comparative Example 2, the percentages of a decrease in the separating performances after immersion in a pH9 buffer solution for 200 hours and after immersion for 400 hours were 15% or more.

As described above, the zeolite membrane complex 1 includes a porous support 11, and zeolite membranes 12 formed on the support 11. The zeolite membranes 12 include a zeolite crystal phase 3 constituted by a plurality of zeolite crystals 31, and a dense grain boundary phase 4, which is a region between the plurality of zeolite crystals 31. The density of at least part of the grain boundary phase 4 is smaller than the density of the zeolite crystal phase 3. Furthermore, the width of the grain boundary phase 4 is 2 nm or more and 10 nm or less.

In this manner, in the zeolite membrane complex 1, the width of the grain boundary phase 4 of the zeolite membranes 12 is set to be as small as 2 nm or more and 10 nm or less, and thus contact of permeant substances that permeate the zeolite membranes 12 with the grain boundary phase 4 can be suppressed. In other words, the amount of permeant substances of the zeolite membranes 12 that come into contact with the grain boundary phase 4 can be reduced. Accordingly, damage to the grain boundary phase 4 due to contact with permeant substances can be suppressed, and thus the durability (e.g., corrosion resistance such as water resistance and organic solvent resistance) of the zeolite membranes 12 can be improved. In the zeolite membranes 12, the grain boundary phase 4 is made dense, and thus damage to the grain boundary phase 4 due to contact with permeant substances can be further suppressed. Accordingly, the durability of the zeolite membranes 12 can be further improved.

Furthermore, in the zeolite membranes 12, the density of at least part of the dense grain boundary phase 4 is smaller than the density of the zeolite crystals 31. Accordingly, the resistance at the time when permeant substances permeate the zeolite membranes 12 (i.e., permeation resistance) can be reduced. As a result, the permeability and the separating performance of the zeolite membranes 12 can be improved. Thus, it is possible to realize high permeability and high separating performance, and high durability of the zeolite membranes 12.

In the zeolite membranes 12, it is preferable that the area of the portion (i.e., low-density portion) of the grain boundary phase 4 with a density that is smaller than the density of the zeolite crystal phase 3 is 10% or more of the area of the entire grain boundary phase 4. Accordingly, the permeation resistance of the zeolite membranes 12 can be further reduced, and the permeability of the zeolite membranes 12 can be further improved.

As described above, it is preferable that the width of the grain boundary phase 4 is 5 times or more and 27 times or less the pore size of the zeolite crystals 31 contained in the zeolite crystal phase 3. Accordingly, permeant substances that permeate the zeolite membranes 12 can be preferably kept from coming into contact with the grain boundary phase 4. As a result, the durability of the zeolite membranes 12 can be preferably improved.

Furthermore, it is preferable that the width of the grain boundary phase 4 is 0.005 times or more and 0.12 times or less the average particle size of the zeolite particles in the zeolite membranes 12. Accordingly, permeant substances that permeate the zeolite membranes 12 can be preferably kept from coming into contact with the grain boundary phase 4. As a result, the durability of the zeolite membranes 12 can be preferably improved.

As described above, it is preferable that the grain boundary phase 4 is made of an inorganic substance. Typically, the corrosion resistance (e.g., water resistance, organic solvent resistance, etc.), the pressure resistance, the thermal resistance, and the like of an inorganic substance are higher than those of an organic substance. Thus, since the grain boundary phase 4 does not substantially contain an organic substance, the durability of the zeolite membranes 12 (e.g., corrosion resistance, pressure resistance, and thermal resistance, etc.) can be further improved.

Furthermore, it is preferable that the grain boundary phase 4 contains an amorphous substance. Accordingly, when the zeolite membranes 12 are heated (e.g., during heating treatment in step S14 described above), stress caused by a difference in thermal expansion between the zeolite crystals 31 with different crystal orientations is reduced, and thus the occurrence of damage such as cracks in the zeolite membranes 12 can be suppressed. That is to say, the durability of the zeolite membranes 12 can be further improved. It is preferable that the amount of amorphous substance that is contained in the grain boundary phase 4 is 10 wt % or more.

As described above, the method for producing the zeolite membrane complex 1 includes a step of preparing a seed crystal (step S11), a step of attaching the seed crystal to a porous support 11 (step S12), and a step of immersing the support 11 in a raw material solution, and causing zeolite to grow from the seed crystal through hydrothermal synthesis, thereby forming zeolite membranes 12 on the support 11 (step S13). The zeolite membranes 12 include a zeolite crystal phase 3 constituted by a plurality of zeolite crystals 31, and a dense grain boundary phase 4, which is a region between the plurality of zeolite crystals 31. The density of at least part of the grain boundary phase 4 is smaller than the density of the zeolite crystal phase 3. Furthermore, the width of the grain boundary phase 4 is 2 nm or more and 10 nm or less. Accordingly, it is possible to easily produce zeolite membranes 12 with high permeability and high separating performance, and high durability.

In production of the zeolite membrane complex 1, it is preferable that, in step S13, solvent of the raw material solution does not contain an amine other than a structure-directing agent. Accordingly, the amine contained in the solvent is prevented from inhibiting growth of zeolite, and zeolite can be preferably allowed to grow on the support 11. As a result, the grain boundary phase 4 between the zeolite crystals 31 can be made smaller, and the durability of the zeolite membranes 12 can be improved.

Furthermore, in production of the zeolite membrane complex 1, it is preferable that, in step S13, solvent of the raw material solution contains alcohol. Accordingly, raw materials can be preferably dissolved when preparing a raw material solution, and zeolite can be preferably allowed to grow during hydrothermal synthesis. As a result, the grain boundary phase 4 between the zeolite crystals 31 can be made smaller, and the durability of the zeolite membranes 12 can be improved.

The above-described separation method includes a step of preparing a zeolite membrane complex 1 (step S21), and a step of supplying a mixture containing a plurality of types of gases or liquids to the zeolite membrane complex 1, and allowing a substance with high permeability in the mixture to permeate the zeolite membrane complex 1, thereby separating the substance from other substances (step S22).

As described above, the zeolite membranes 12 have high permeability and high separating performance, and high durability, and thus, according to the separation method, it is possible to efficiently separate a mixture over a relatively long period of time. Furthermore, the separation method is particularly suited to separate a mixture containing at least one of hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

Various changes may be made to the above-described zeolite membrane complex 1, method for producing the zeolite membrane complex 1, and separation method.

For example, in the zeolite membranes 12 of the zeolite membrane complex 1, it is possible that the width of the grain boundary phase 4 is less than 5 times the pore size of the zeolite crystals 31 or is more than 27 times the pore size, as long as the width is 2 nm or more and 10 nm or less. Furthermore, it is also possible that the width of the grain boundary phase 4 is less than 0.005 times the average particle size of the zeolite particles in the zeolite membranes 12 or is more than 0.12 times the average particle size, as long as the width is 2 nm or more and 10 nm or less.

In the zeolite membranes 12, it is also possible that an area of a portion of the grain boundary phase 4 with a density that is smaller than the density of the zeolite crystals 31 is less than 10% of an area of the entire grain boundary phase 4.

Various changes may be made to the components of the grain boundary phase 4. For example, it is possible that the grain boundary phase 4 is constituted only by an amorphous substance. Alternatively, it is also possible that the grain boundary phase 4 does not contain an amorphous substance. The grain boundary phase 4 may or may not contain crystals other than the zeolite crystals 31. Furthermore, the grain boundary phase 4 does not absolutely have to be constituted only by an inorganic substance, and also may contain an organic substance.

In production of the zeolite membrane complex 1, various changes may be made to the solvent of the raw material solution. For example, the solvent does not absolutely have to contain alcohol. Furthermore, the solvent may contain an amine other than a structure-directing agent.

In the separating apparatus 2 and the separation method, substances other than the substances given as an example in the description above may be separated from a mixture.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The zeolite membrane complex of the present invention can be used, for example, as liquid separation membranes, and also used in various fields in which zeolite is used, as separation membranes for those other than liquid, adsorption membranes for various substances, and the like.

REFERENCE SIGNS LIST

1 Zeolite membrane complex
3 Zeolite crystal phase
4 Grain boundary phase
11 Support
12 Zeolite membrane
31 Zeolite crystals
S11 to S14, S21 to S22 Step

The invention claimed is:

1. A zeolite membrane complex comprising:
a porous support; and
a zeolite membrane formed on said support,
wherein said zeolite membrane includes
   a zeolite crystal phase constituted by a plurality of zeolite crystals, and
   a dense grain boundary phase, which is a region between said plurality of zeolite crystals,
a density of at least part of said grain boundary phase is smaller than a density of said zeolite crystal phase, and
a width of said grain boundary phase is 2 nm or more and 10 nm or less.

2. The zeolite membrane complex according to claim 1, wherein the width of said grain boundary phase is 5 times or more and 27 times or less a pore size of said zeolite crystals contained in said zeolite crystal phase.

3. The zeolite membrane complex according to claim 1, wherein the width of said grain boundary phase is 0.005 times or more and 0.12 times or less an average particle size of zeolite particles in said zeolite membrane.

4. The zeolite membrane complex according to claim 1, wherein said grain boundary phase is constituted by an inorganic substance.

5. The zeolite membrane complex according to claim 1, wherein said grain boundary phase contains an amorphous substance.

6. The zeolite membrane complex according to claim 1, wherein an area of a portion of said grain boundary phase with a density that is smaller than a density of said zeolite crystal phase is 10% or more of an area of said entire grain boundary phase.

7. A method for producing a zeolite membrane complex, comprising the steps of:
a preparing a seed crystal;
b attaching said seed crystal to a porous support;
c immersing said support in a raw material solution, and
   causing zeolite to grow from said seed crystal through hydrothermal synthesis, thereby forming a zeolite membrane on said support,
wherein said zeolite membrane includes
a zeolite crystal phase constituted by a plurality of zeolite crystals, and
a dense grain boundary phase, which is a region between said plurality of zeolite crystals,
a density of at least part of said grain boundary phase is smaller than a density of said zeolite crystal phase, and
a width of said grain boundary phase is 2 nm or more and 10 nm or less.

8. The method for producing a zeolite membrane complex according to claim 7, wherein, in said step c, solvent of said raw material solution does not contain an amine other than a structure-directing agent.

9. The method for producing a zeolite membrane complex according to claim 7, wherein, in said step c, solvent of said raw material solution contains alcohol.

10. A separation method comprising the steps of:
a preparing the zeolite membrane complex according to claim 1; and
b supplying a mixture containing a plurality of types of gases or liquids to said zeolite membrane complex, and allowing a substance with high permeability in said mixture to permeate said zeolite membrane complex, thereby separating said substance from other substances.

11. The separation method according to claim 10, wherein said mixture contains at least one of hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

* * * * *